US011470516B2

(12) United States Patent
Awoniyi-Oteri et al.

(10) Patent No.: US 11,470,516 B2
(45) Date of Patent: Oct. 11, 2022

(54) MULTI TRANSMIT/RECEIVE POINT MAKE BEFORE BREAK HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Hung Dinh Ly, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/948,345

(22) Filed: Sep. 14, 2020

(65) Prior Publication Data

US 2021/0084546 A1 Mar. 18, 2021

Related U.S. Application Data

(60) Provisional application No. 62/910,850, filed on Oct. 4, 2019, provisional application No. 62/901,192, filed on Sep. 16, 2019.

(51) Int. Cl.
*H04W 36/00* (2009.01)

(52) U.S. Cl.
CPC ... *H04W 36/0061* (2013.01); *H04W 36/0083* (2013.01)

(58) Field of Classification Search
CPC ......... H04W 36/0061; H04W 36/0083; H04W 88/085; H04W 36/18; H04B 7/022
See application file for complete search history.

(56) References Cited

FOREIGN PATENT DOCUMENTS

WO 2018141246 A1 8/2018

OTHER PUBLICATIONS

Huawei et al., "Higher Layer Implications of NC-JT Transmission from Multiple TRPs", 3GPP Draft; R1-1706980, 3rd Generation Partnership Project (3GPP), Mobile Competence Centre ; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051272210, 2 Pages, Retrieved from the Internet: URL:http://www.3gpp.org/ftp/Meetings_3GPP_SYNC/RAN1/Docs/ [retrieved on May 14, 2017], section 2.

(Continued)

*Primary Examiner* — Marisol Figueroa
(74) *Attorney, Agent, or Firm* — Harrity & Harrity, LLP

(57) ABSTRACT

Various aspects of the present disclosure generally relate to wireless communication. In some aspects, a user equipment (UE) may determine whether a capability of the UE is sufficient for a make-before-break (MBB) handover from a source set of cells to a target set of cells, wherein the source set of cells is provided by a first set of transmit/receive points (TRPs) and the target set of cells is provided by a second set of TRPs; and selectively perform the MBB handover using a first capability configuration for the MBB handover or a second capability configuration for the MBB handover based at least in part on whether the capability of the UE is sufficient for the MBB handover. Numerous other aspects are provided.

36 Claims, 6 Drawing Sheets

(56) References Cited

OTHER PUBLICATIONS

Intel Corporation: "Mobility and Beam Support in NR," 3GPP Draft, 3GPP TSG RAN WG2 Meeting #94, R2-163579-NR-BEAM Mobility, 3rd Generation Partnership Project (3GPP), Mobile Competence Centre, 650, Route Des Lucioles, F-06921, Sophia-Antipolis Cedex, France, vol. RAN WG2. No. Nanjing. China, May 23, 2016-May 27, 2016, May 22, 2016 (May 22, 2016), XP051105029, 7 pages, Retrieved from the Internet: URL: http://www.3gpp.org/ftp/Meetings_3GPP_SYNC/RAN2/Docs/ [retrieved on May 22, 2016] pp. 2-7; figures 2.3.4.5.6.

International Search Report and Written Opinion—PCT/US2020/070541—ISA/EPO—dated Nov. 11, 2020.

NTT Docomo, et al., "Enhancements on Multi-TRP/panel Transmission," 3GPP Draft, 3GPP TSG RAN WG1 #98, R1-1909201, 3rd Generation Partnership Project (3GPP), Mobile Competence Centre, 650, Route Des Lucioles, F-06921, Sophia-Antipolis Cedex, France, vol. RAN WG1. No. Prague. CZ, Aug. 26, 2019-Aug. 30, 2019, Aug. 17, 2019 (Aug. 17, 2019), XP051765806, 36 pages, Retrieved from the Internet: URL: http://www.3gpp.org/ftp/tsg_ran/WG1_RL1/TSGR1_98/Docs/R1-1909201.zip [retrieved on Aug. 17, 2019] pp. 5-7 pp. 14-17.

MULTI TRANSMIT/RECEIVE POINT MAKE BEFORE BREAK HANDOVER

CROSS-REFERENCE TO RELATED APPLICATION

This patent application claims priority to U.S. Provisional Patent Application No. 62/901,192, filed on Sep. 16, 2019, and to U.S. Provisional Patent Application No. 62/910,850, filed on Oct. 4, 2019, both entitled "MULTI TRANSMIT/RECEIVE POINT MAKE BEFORE BREAK HANDOVER," and both assigned to the assignee hereof. The disclosure of the prior applications is considered part of and is incorporated by reference into this patent application.

FIELD OF THE DISCLOSURE

Aspects of the present disclosure generally relate to wireless communication and to techniques and apparatuses for a multi transmit/receive point (TRP) make before break (MBB) handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit/receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether a capability of the UE is sufficient for a make-before-break (MBB) handover from a source set of cells to a target set of cells, wherein the source set of cells is provided by a first set of transmit/receive points (TRPs) and the target set of cells is provided by a second set of TRPs; and selectively performing the MBB handover using a first capability configuration for the MBB handover or a second capability configuration for the MBB handover based at least in part on whether the capability of the UE is sufficient for the MBB handover.

In some aspects, a UE for wireless communication may include memory and one or more processors operatively coupled to the memory. The memory and the one or more processors may be configured to determine whether a capability of the UE is sufficient for an MBB handover from a source set of cells to a target set of cells, wherein the source set of cells is provided by a first set of TRPs and the target set of cells is provided by a second set of TRPs; and selectively perform the MBB handover using a first capability configuration for the MBB handover or a second capability configuration for the MBB handover based at least in part on whether the capability of the UE is sufficient for the MBB handover.

In some aspects, a non-transitory computer-readable medium may store one or more instructions for wireless communication. The one or more instructions, when executed by one or more processors of a UE, may cause the one or more processors to: determine whether a capability of the UE is sufficient for an MBB handover from a source set of cells to a target set of cells, wherein the source set of cells is provided by a first set of TRPs and the target set of cells is provided by a second set of TRPs; and selectively perform the MBB handover using a first capability configuration for the MBB handover or a second capability configuration for the MBB handover based at least in part on whether the capability of the UE is sufficient for the MBB handover.

In some aspects, an apparatus for wireless communication may include means for determining whether a capability of the apparatus is sufficient for an MBB handover from a source set of cells to a target set of cells, wherein the source set of cells is provided by a first set of TRPs and the target set of cells is provided by a second set of TRPs; and means for selectively performing the MBB handover using a first capability configuration for the MBB handover or a second capability configuration for the MBB handover based at least in part on whether the capability of the apparatus is sufficient for the MBB handover.

In some aspects, a method of wireless communication performed by a first transmit/receive point (TRP) includes determining information identifying a communication schedule for a make-before-break (MBB) handover of a user equipment (UE) involving the first TRP and a second TRP;

and providing the information identifying the communication schedule to the second TRP.

In some aspects, a first TRP for wireless communication includes a memory and one or more processors operatively coupled to the memory, the memory and the one or more processors configured to: determine information identifying a communication schedule for an MBB handover of a UE involving the first TRP and a second TRP; and provide the information identifying the communication schedule to the second TRP.

In some aspects, a non-transitory computer-readable medium storing a set of instructions for wireless communication includes one or more instructions that, when executed by one or more processors of a first TRP, cause the first TRP to determine information identifying a communication schedule for an MBB handover of a UE involving the first TRP and a second TRP; and provide the information identifying the communication schedule to the second TRP.

In some aspects, a first apparatus for wireless communication includes means for determining information identifying a communication schedule for an MBB handover of a UE involving the first apparatus and a second apparatus; and means for providing the information identifying the communication schedule to the second apparatus.

Aspects generally include a method, apparatus, system, computer program product, non-transitory computer-readable medium, user equipment, base station, wireless communication device, transmit/receive point, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as “elements”). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
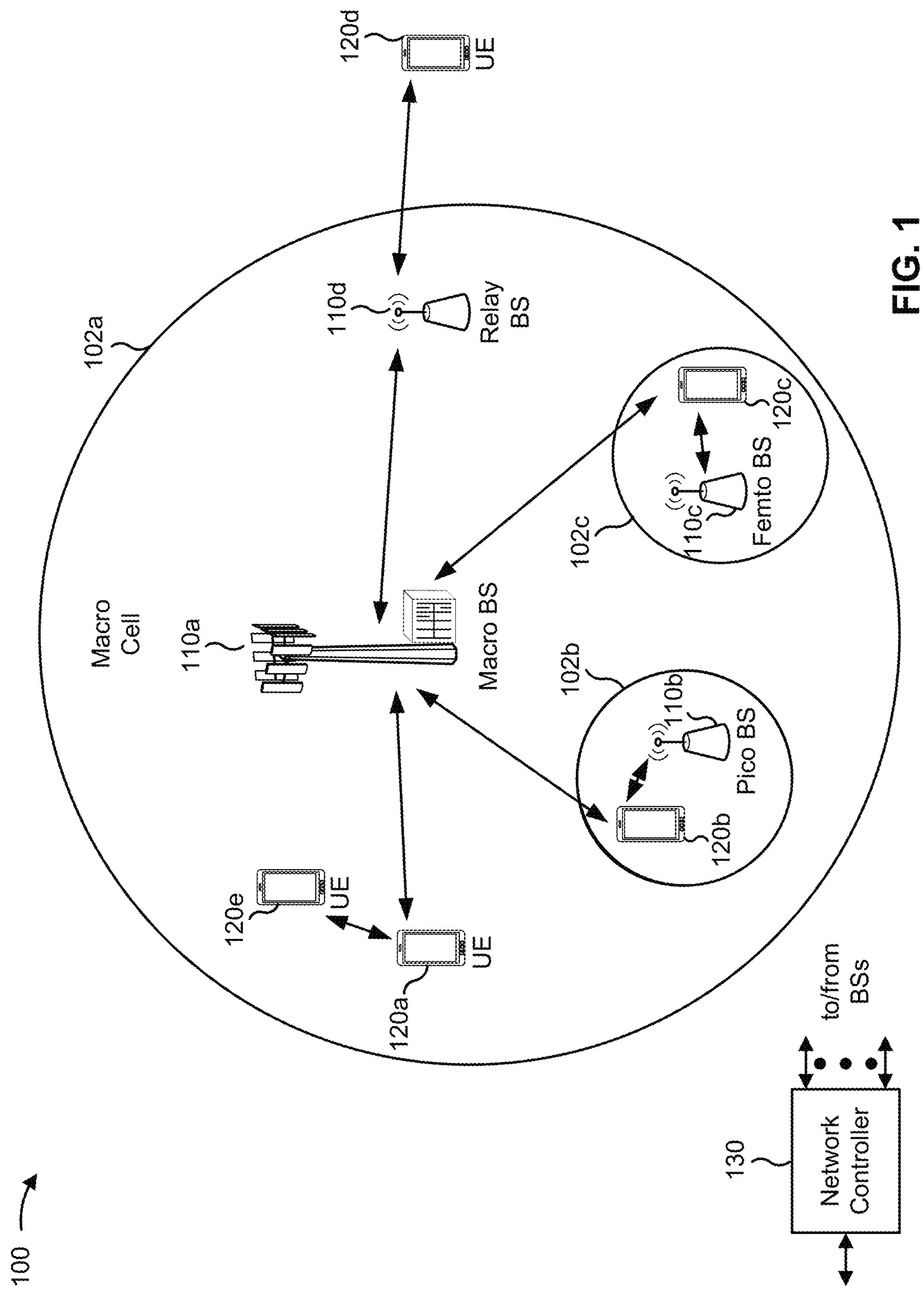
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit/receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
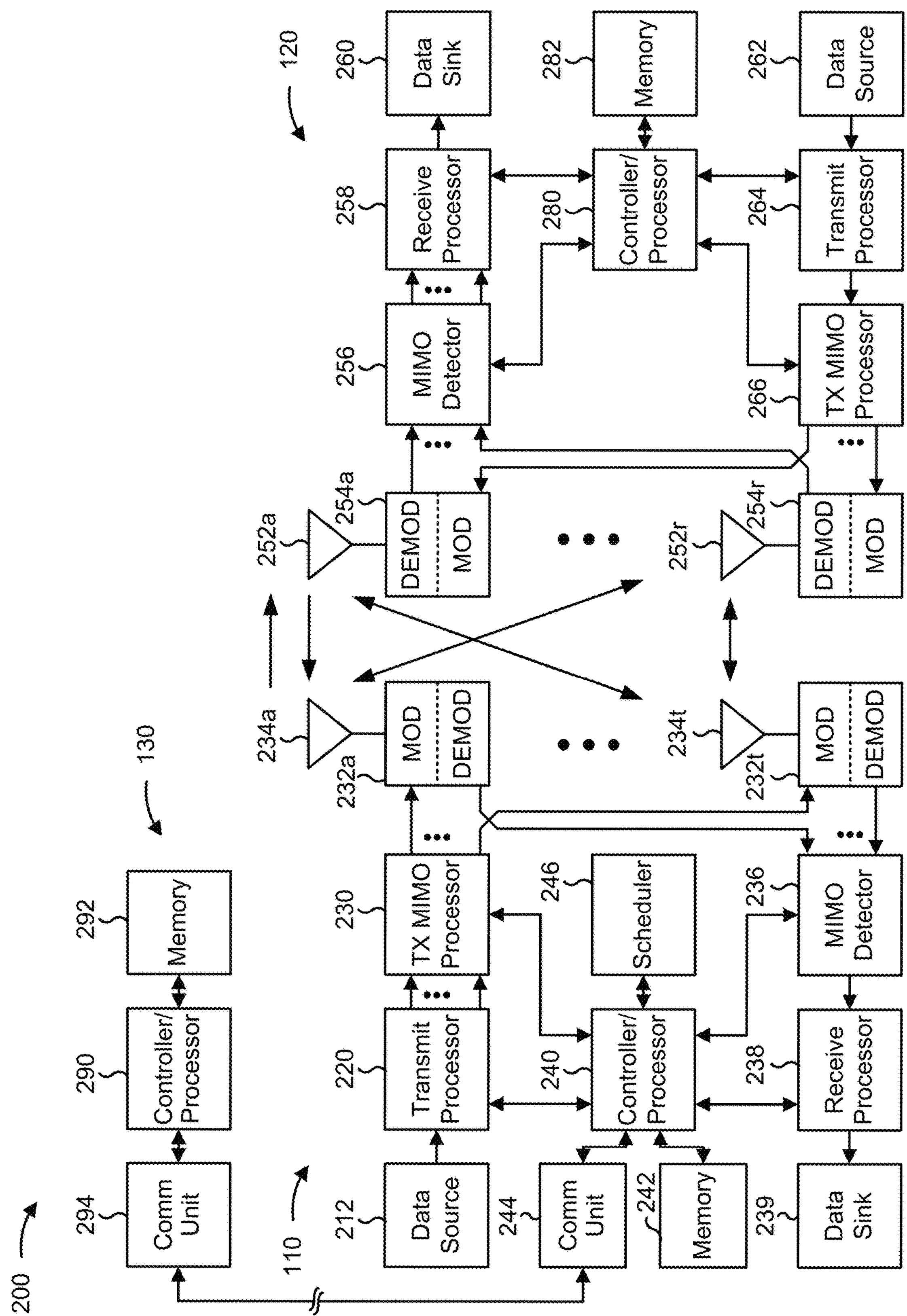
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a multi-TRP based MBB handover, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for determining whether a capability of the UE is sufficient for a make-before-break (MBB) handover from a source set of cells to a target set of cells; means for selectively performing the MBB handover using a first capability configuration for the MBB handover or a second capability configuration for the MBB handover based at least in part on whether the capability of the UE is sufficient for the MBB handover; means for dropping one or more links, of a plurality of links associated with the source set of cells and the target set of cells, based at least in part on the second capability configuration and the capability of the UE; means for performing the MBB handover using one or more multiplexing techniques for at least one of: communications via the source set of cells and the target set of cells, or communications with the first set of TRPs and the second set of TRPs; means for identifying a partial or full overlap between two or more communications for two or more different TRPs of the first set of TRPs and the second set of TRPs; means for dropping one or more communications, of the two or more communications, based at least in part on a rule; means for receiving information identifying respective communication schedules of the first set of TRPs and the second set of TRPs, wherein the MBB handover is based at least in part on the respective communication schedules; means for providing at least part of the information identifying the respective communication schedules to at least one of the first set of TRPs or the second set of TRPs; means for providing hybrid automatic repeat request (HARD) feedback for the first set of TRPs and the second set of TRPs; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a first TRP (e.g., base station 110) may include means for determining information identifying a communication schedule for an MBB handover of a UE involving the first TRP and a second TRP, means for providing the information identifying the communication schedule to the second TRP and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE that is connected to a source cell provided by a source base station may perform a handover in order to connect to a target cell provided by a target base station. Some handovers may be associated with a service interruption, which may degrade performance of the UE, reduce throughput, and impact the operation of some applications. One technique for reducing or eliminating interruption associated with handovers is a make-before-break (MBB) handover. In an MBB handover, the UE may maintain contemporaneous connectivity with the source base station and the target base station. Thus, the UE can continue to communicate with the core network via one of the source base station or the target base station while the connection of the UE is handed over from the source base station to the target base station. An MBB handover is also referred to as a dual active protocol stack (DAPS) handover, since the UE may have two active protocol stacks during the handover: one associated with the source cell and another associated with the target cell.

Some wireless communication systems may use multiple transmit/receive points (TRPs) to transmit or receive a communication. For example, a multi-TRP communication may be transmitted or received by two or more different base stations, two or more different TRPs (e.g., of one base station or of multiple base stations), two or more different antenna groups (e.g., of one antenna panel of a base station, of multiple antenna panels of one or more base stations), and/or the like. It should be noted that "multi-TRP communication," as used herein, refers to any of the above transmission/reception configurations or similar configurations (e.g., two or more different base stations, two or more different TRPs, two or more different antenna groups, and/or the like).

Some multi-TRP communications may use a single physical downlink control channel (PDCCH) that schedules a data transmission of multiple TRPs. Other multi-TRP communications may use multiple PDCCHs that each schedule a respective data transmission of a corresponding TRP. Two or more TRPs of a multi-TRP communication may be associated with a backhaul, such as a backhaul that can be assumed to be ideal (e.g., assuming zero latency and packet loss) or a backhaul that is non-ideal (e.g., assuming nonzero latency and/or packet loss).

A UE performing multi-TRP communication may perform a handover from a first set of TRPs (e.g., one or more TRPs) to a second set of TRPs (e.g., one or more TRPs). For example, the UE may be handed over from two or more TRPs associated with a source cell to one or more TRPs (e.g., a single TRP or multiple TRPs) associated with a target cell. If the UE is to perform an MBB handover from the first set of TRPs to the second set of TRPs, in some cases, the UE may maintain multiple active links with the first set of TRPs and the second set of TRPs. For example, if a source cell uses two TRPs and a target cell uses two TRPs, then the UE may maintain up to four links at a given time. Similarly, if a source cell uses two TRPs and a target cell uses one TRP, then the UE may maintain up to three links at a given time. In other cases, the UE may be reconfigured from a multi-TRP configuration with the source cell before the MBB handover to a single-TRP (e.g., a single link) configuration with the source cell during the MBB handover. In such a case, the UE may have a single-TRP connection with the target cell during the MBB handover until the connection with the source cell is released. Thereafter, the UE may maintain the single-TRP configuration or may enter a multi-TRP configuration with regard to the target cell. Some of the above combinations of multi-TRP and/or single TRP connections may exceed the capabilities of some UEs, and may use significant UE resources. Furthermore, if communications on the multiple links are not coordinated, collisions between the communications on the multiple links are likely to occur. Collisions between communications may lead to decreased reliability, diminished throughput, and increased rates of retransmission, thereby using communication resources of the UE and the TRPs.

Some techniques and apparatuses described herein provide an MBB handover for a multi-TRP deployment. For example, a UE may selectively use a first capability configuration or a second capability configuration based at least in part on whether a capability of the UE is sufficient to perform the MBB handover for the multi-TRP deployment. If the capability of the UE is insufficient for the MBB handover, the UE may use a diminished capability configuration for the MBB handover, in which the capability used by the UE is less than the full capability of the MBB handover, which is described in more detail elsewhere herein. If the capability of the UE is sufficient for the MBB handover, then the UE may perform the MBB handover in accordance with a baseline capability configuration or a full capability configuration of the MBB handover. Further, some techniques and apparatuses described herein provide transmission scheduling and multiplexing techniques for multi-TRP MBB handovers and hybrid automatic repeat request (HARM) feedback provision for multi-TRP MBB handovers.

Figure 3:
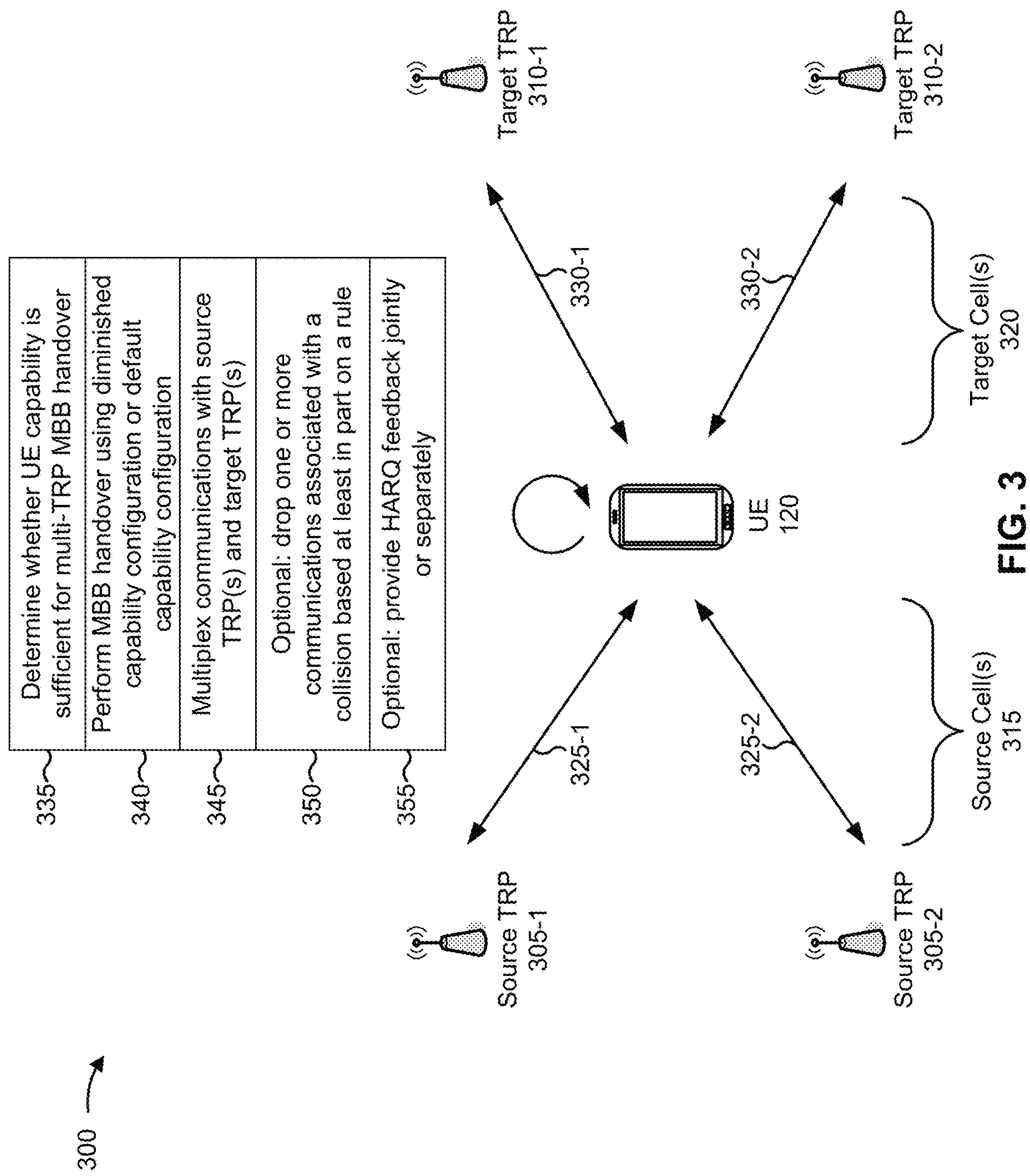
FIG. 3 is a diagram illustrating an example of selecting a capability configuration for a make-before-break (MBB) handover, in accordance with various aspects of the present disclosure.

FIG. 3 is a diagram illustrating an example 300 of selecting a capability configuration for an MBB handover, in accordance with various aspects of the present disclosure. As shown, example 300 includes source TRPs 305-1 and 305-2. As further shown, example 300 includes target TRPs 310-1 and 310-2. Source TRPs 305 provide one or more source cells 315, to which a UE 120 may be connected. Target TRPs 310 provide one or more target cells 320, to which the UE 120 may be connected after performing an MBB handover from the source TRP(s) 305 to the target TRP(s) 310. Furthermore, the UE 120 may be associated with links 325-1 and 325-2 to the source TRPs 305-1 and 305-2, and links 330-1 and 330-2 to the target TRPs 310-1 and 310-2.

In some aspects, TRPs 305/310 may be provided by a single base station (e.g., base station 110). In some aspects, TRPs 305/310 may be provided by respective base stations. In some aspects, TRPs 305/310 may comprise respective antenna panels, or respective antenna groups of a single antenna panel or multiple antenna panels. In other words, TRP 305/315 may or may not represent a single TRP. TRP 305 may represent a device that provides a link 325 to a source cell 315, and TRP 310 may represent a device that provides a link 330 to a target cell 320.

In some aspects, example 300 may include a single target TRP 310. For example, the UE 120 may be handed over from multiple source TRPs 305 to a single target TRP 310. In this case, the UE 120 may be associated with a single link 330 to the target TRP 310. In some aspects, example 300 may include a single source TRP 305 and a single target TRP 310. For example, the multiple source TRPs 305 may reconfigure to a single source TRP 305 for the MBB handover, and the UE 120 may be handed over to a single TRP 310, after which the UE 120 may maintain the single-TRP link 330 or may establish multiple links 330 for a multi-TRP configuration. In some aspects, an MBB handover involving a single source TRP 305 and a single target TRP 310, or multiple source TRPs 305 and a single target TRP 310, may involve a lower threshold for capabilities than an MBB handover to two or more target TRPs 310. The UE 120 may determine whether the capability of the UE 120 is sufficient for the MBB handover based at least in part on whether the MBB handover is from a single source TRP 305, to a single target TRP 310, and/or to multiple target TRPs 310.

As shown by reference number 335, the UE 120 may determine whether a capability of the UE is sufficient for a multi-TRP MBB handover, referred to herein as an MBB handover for brevity. For example, the MBB handover may use more resources (e.g., scheduling resources, transmit beams, receive beams, data, layers, and/or the like) than a non-multi-TRP MBB handover, since the UE 120 may be connected to a larger number of TRPs for the MBB handover than for the non-multi-TRP handover. This increased resource usage may exceed the capabilities of some UEs, and may be within the capabilities of other UEs. Thus, the UE 120 may determine whether a capability of the UE 120 is sufficient for the MBB handover.

As shown by reference number 340, the UE 120 may perform the MBB handover using a full capability configuration (e.g., when the capability of the UE 120 is sufficient for the MBB handover using the full capability configuration) or a diminished capability configuration (e.g., when the capability of the UE 120 is not sufficient for the MBB handover using a full capability configuration of the MBB handover). When the UE 120 uses the diminished capability configuration, the UE 120 may drop one or more links based at least in part on a rule, as described in more detail elsewhere herein. The full capability configuration is sometimes referred to herein as a first capability configuration and the diminished capability configuration is sometimes referred to herein as a second capability configuration. Examples of capabilities and corresponding first capability configurations and second capability configurations are provided below.

In some aspects, the capability may relate to a maximum number of control resource sets (CORESETs) configurable for the UE 120. For example, the UE 120 may be capable of monitoring or being configured with a first number of CORESETs for control information, and the MBB handover may require a second number of CORESETs for control information for the TRPs 305/310. If the second number is larger than the first number, then the UE 120 may use a diminished capability configuration, and may thus drop one or more links 325 or 330. As just one example, the first number may be 5 (e.g., 5 CORESETs) and the second number may be 10, or may be equal to twice the total number of links 325/330.

In some aspects, a BS 110 may configure more CORESETs for a particular cell (e.g., the source cell 315 or the target cell 320) than for another cell. For example, if the UE 120 is capable of being configured with 5 CORESETs, then the base station 110 may configure 3 CORESETs for the source cell 315 and 2 CORESETs for the target cell 320.

In some aspects, the BS 110 may configure a minimum number of CORESETs per TRP 305/310, and one or more remaining CORESETs may be assigned to one or more links 325 or 330. For example, the BS 110 may configure one CORESET per TRP 305/310, and may prioritize source TRPs 305 over target TRPs 310 for configuration of the remaining CORESETs.

In some aspects, the capability may relate to a maximum number of beams or transmission configuration indicator (TCI) states that can be contemporaneously supported by the UE 120. A TCI state may identify a quasi-colocation parameter for a beam to be used for a link 325 or 330. If a UE 120 is capable of using a number of TCI states equal to or greater than the number of links 325/330, then the UE 120 may use the full capability configuration. If the UE 120 is not capable of using the number of TCI states equal to or greater than the number of links 325/330, then the UE 120 may drop one or more links. For example, the BS 110 may not configure one or more TCI states that exceed the UE 120's capability, or the UE 120 may drop one or more TCI states that exceed the UE 120's capability.

In some aspects, the capability may relate to a maximum number of codewords that can be contemporaneously supported by the UE 120. If the UE 120 is configured with more codewords than can be contemporaneously supported by (e.g., successfully received by) the UE 120, then the UE 120 may use a diminished capability configuration and may accordingly drop one or more codewords.

In some aspects, the capability may relate to a maximum number of layers per component carrier that can be contemporaneously supported by the UE 120. For example, the UE 120 may be configured to support a first number of layers per component carrier. If the first number of layers is less than a second number of layers used for the MBB handover, then the UE 120 may use a diminished capability configuration and may accordingly drop one or more codewords.

In some aspects, the capability may relate to a maximum number of control channel candidates that can be monitored by the UE 120 in a slot. For example, the UE 120 may be configured to support a first number of control channel candidates in a slot. If the first number of control channel candidates is less than a second number of control channel candidates used for the MBB handover, then the UE 120 may use a diminished capability configuration and may accordingly drop one or more control channel candidates.

As shown by reference number 345, in some aspects, the UE 120 may multiplex communications with the source TRP(s) 305 and the target TRP(s) 310. For example, the UE 120 may perform one or more multiplexing techniques for MBB handover communications with the source TRP(s) 305 and the target TRP(s) 310. These multiplexing techniques may be performed for the diminished capability configuration or for the full capability configuration. Examples of such multiplexing techniques are provided below.

In some aspects, the UE 120 may perform spatial division multiplexing (SDM). For example, the UE 120 may use spatially distinct beams to communicate with the source TRP(s) 305 and the target TRP(s) 310. In some aspects, the UE 120 may use one or more first antenna panels to communicate with the source TRP(s) 305 and one or more second antenna panels to communicate with the target TRP(s) 310, wherein the one or more first antenna panels are different from the one or more second antenna panels.

In some aspects, the UE 120 may perform frequency division multiplexing (FDM). For example, the UE 120 may use a different frequency to communicate with the source TRP(s) 305 than to communicate with the target TRP(s) 310. In some aspects, the UE 120 may use a respective frequency for each link 325/330.

In some aspects, the UE 120 may perform time division multiplexing (TDM). For example, the UE 120 may communicate with each TRP 305/310 and/or on each link 325/330 using different time resources (e.g., slots and/or the like). In this case, the UE 120 may use TDM for communication on a single antenna panel, or may use TDM for communication on multiple antenna panels. For example, the UE 120 may use TDM for a first antenna panel's communications with the source TRP(s) 305, and may use TDM for a second antenna panel's communications with the target TRP(s) 310.

In some aspects, the UE 120 may perform multiple different multiplexing techniques. For example, the UE 120 may use FDM for TRP(s) 305/310, and may use TDM or SDM for cells. In this case, the UE 120 may communicate with TRP(s) 305/310 on a source cell 315 or a target cell 320 using different frequency resources, and may use SDM or TDM to multiplex communications with regard to the source cell 315 and the target cell 320. As another example, the UE 120 may use TDM for TRP(s) 305/310, and may use SDM for cells. In this case, the UE 120 may communicate with TRPs of a single cell using different time resources, and may use SDM to multiplex communications with regard to the source cell 315 and the target cell 320.

As shown by reference number 350, in some aspects the UE 120 may drop one or more communications associated with a partial or full overlap based at least in part on a rule. For example, the UE 120 may detect a partial or full overlap between two or more uplink or downlink communications (e.g., two or more uplink communications, two or more downlink communications, or a combination of uplink and downlink communications) for two or more TRP(s) 305/310. In such a case, the UE 120 may drop one or more communications, of the two or more communications, based at least in part on a rule. For example, the UE 120 may drop a packet, a frame, a link, a slot, a data channel, a control channel, a logical channel, and/or the like. In some aspects, the TRP(s) 305/310 may communicate with each other (e.g., via a backhaul or an over-the-air (OTA) communication via the UE) to configure uplink or downlink transmission schedules, as described in more detail in connection with FIG. 4. Particular examples of the rule for dropping the one or more communications are provided below. The UE 120 may drop or prioritize traffic based at least in part on one or more of the below rules, or a combination of two or more of the below rules. It should be noted that the determination of which link to drop or configure can be performed as the collision occurs (e.g., "on the fly").

In some aspects, the UE 120 may drop an uplink communication or a downlink communication based at least in part on a type of cell associated with the communication (e.g., a source cell or a target cell). For example, the UE 120 may prioritize communications on the target cell 320 over communications on the source cell 315, and may thus drop communications on the source cell 315 that collide with communications on the target cell 320.

In some aspects, the UE 120 may drop a communication based at least in part on a random or pseudorandom rule, such as selecting a communication associated with a cell with a lowest TRP index or a highest TRP index.

In some aspects, the UE 120 may drop a communication based at least in part on a quality of service (QoS) threshold. For example, the UE 120 may drop a communication based at least in part on an application associated with the communication and/or a QoS metric (e.g., bit error rate, packet delay budget, latency, and/or the like).

In some aspects, the UE 120 may drop a communication based at least in part on whether the communication is an uplink communication or a downlink communication. For example, when an uplink communication collides with a downlink communication, the UE 120 may prioritize downlink communications over uplink communications, and may accordingly drop the uplink communication.

In some aspects, the UE 120 may drop a communication based at least in part on a configuration or based at least in part on information received from the TRP 305 and/or the TRP 310. For example, the UE 120 may drop or prioritize a communication received from a TRP that transmitted a synchronization signal or physical broadcast channel (SS/PBCH) block. As another example, the UE 120 may drop or prioritize a communication received from a TRP that is associated with a configured initial downlink bandwidth part. As yet another example, a TRP (e.g., a TRP associated with an SS/PBCH block or an initial downlink bandwidth part) may provide an indication of which communication is to be prioritized or dropped, and the UE 120 may prioritize or drop the communication accordingly.

As shown by reference number 355, in some aspects, the UE 120 may provide hybrid automatic repeat request (HARQ) feedback to the TRP(s) 305 and/or the TRP(s) 310. The HARQ feedback may indicate whether a downlink transmission from TRP 305 or TRP 310 is successful. In some aspects, the UE 120 may provide separate HARQ feedback per link 325/330. For example, the UE 120 may provide feedback for source TRP 305-1 on link 325-1, feedback for target TRP 310-1 on link 330-1, and so on. In some aspects, the UE 120 may provide HARQ feedback jointly for two or more cells. For example, the UE 120 may combine the HARQ feedback for TRPs 305 associated with a source cell 315, or may combine HARQ feedback for TRPs 310 associated with a target cell 320. As another example, the UE 120 may combine HARQ feedback for all TRPs 305 and 310 associated with the MBB handover. Providing separate HARQ feedback may simplify processing at the TRP side and reduce backhaul requirements, whereas providing joint HARQ feedback may reduce UE resource usage.

As indicated above, FIG. 3 is provided as an example. Other examples may differ from what is described with respect to FIG. 3.

Figure 4:
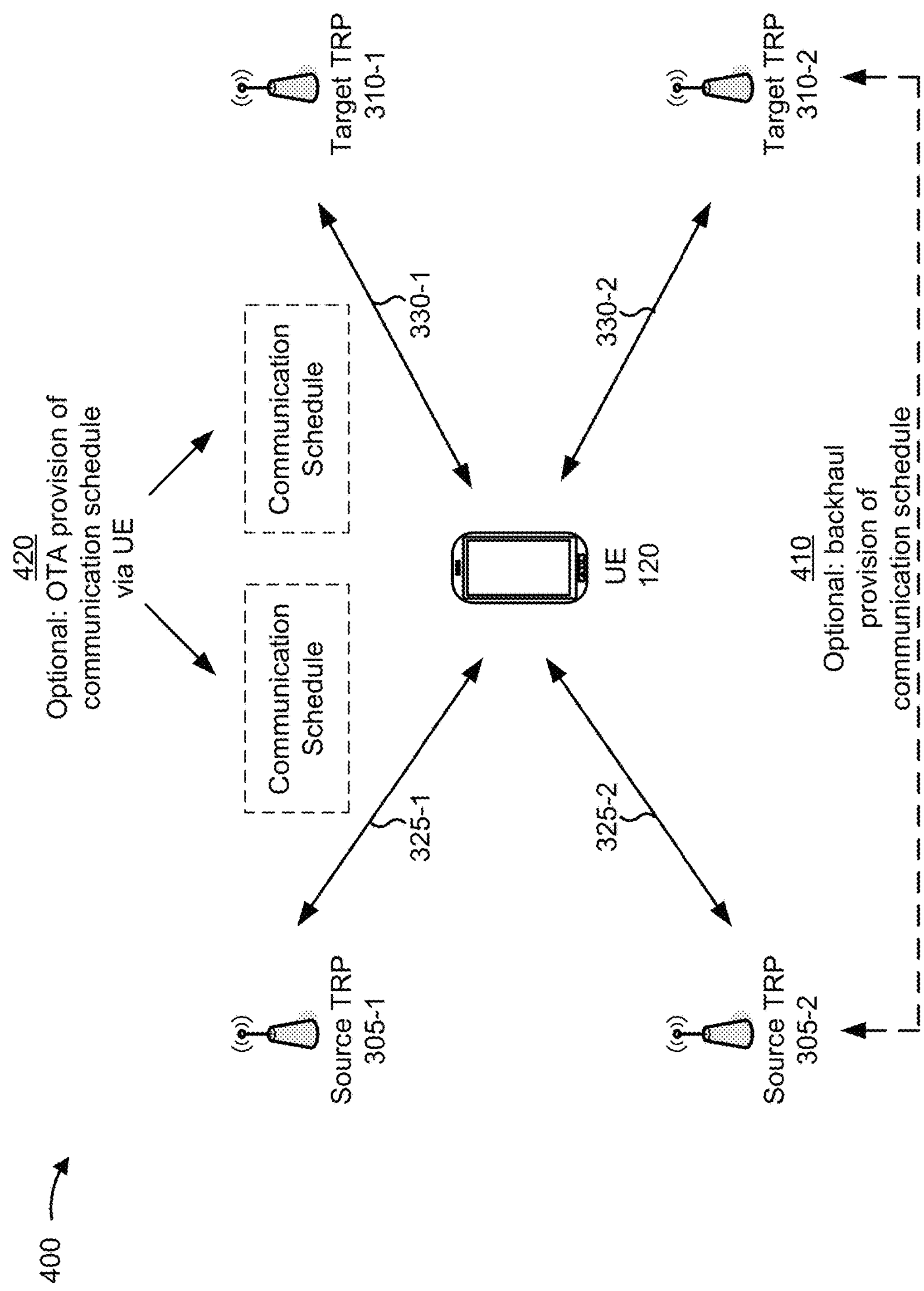
FIG. 4 is a diagram illustrating an example of communication of transmission scheduling information for an MBB handover, in accordance with various aspects of the present disclosure.

FIG. 4 is a diagram illustrating an example 400 of communication of scheduling information for an MBB handover, in accordance with various aspects of the present disclosure. As shown in FIG. 4, source TRP(s) 305 and target TRP(s) 310 may communicate scheduling information with each other. The scheduling information may indicate downlink control channel occasions, timing information (e.g., K0, K1, K2, and/or the like), uplink control channel occasions, uplink shared channel occasions, and/or other scheduling information. The TRPs 305/310 may use this information for scheduling uplink or downlink communications with the UE 120 to reduce or prevent the occurrence of collisions of uplink and/or downlink traffic.

As shown by reference number 410, in some aspects, source TRP 305 and target TRP 310 may provide uplink or downlink scheduling information (shown as communication schedules) via a backhaul connection. While the backhaul connection is shown between source TRP 305-2 and target TRP 310-2, this information may be provided on a backhaul connection between any two or more source TRPs 305 and/or target TRPs 310 (e.g., between two source TRPs 305, between a source TRP 305 and a target TRP 310, or between two target TRPs 310). Providing the scheduling information via a backhaul connection may conserve resources of the UE 120 that would otherwise be used to provide the scheduling information using an OTA link, and may reduce latency associated with providing the scheduling information.

As shown by reference number 420, in some aspects, source TRP 305 and target TRP 310 may communicate scheduling information (e.g., a communication schedule) via an OTA link. For example, source TRP 305 may provide the scheduling information to UE 120, and UE 120 may provide the scheduling information to target TRP 310. As another example, target TRP 310 may provide the scheduling information to UE 120, and UE 120 may provide the scheduling information to source TRP 305. OTA provision of the scheduling information may be useful when source TRP 305 and target TRP 310 are not associated with a backhaul link or when backhaul link conditions are non-ideal.

As indicated above, FIG. 4 is provided as an example. Other examples may differ from what is described with respect to FIG. 4.

Figure 5:
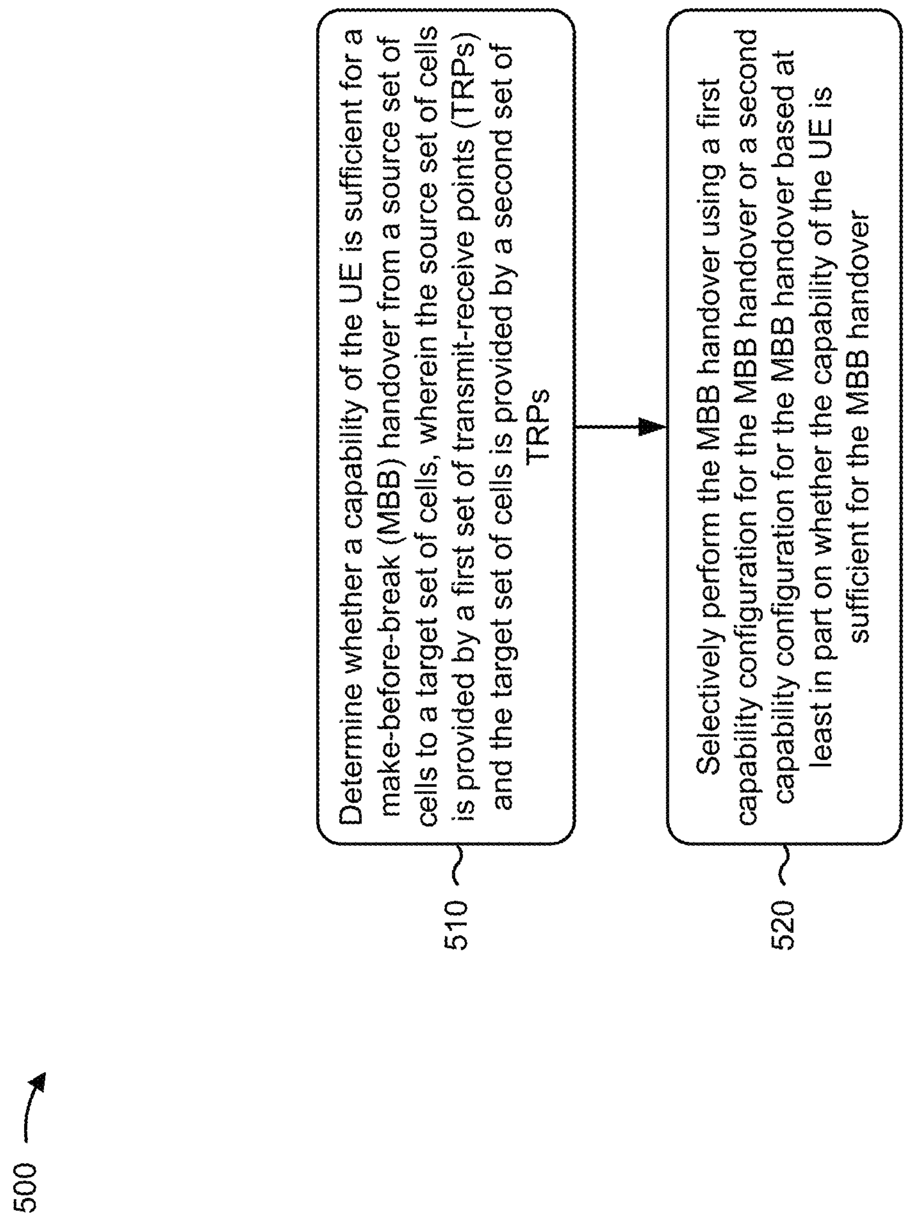
FIG. 5 is a diagram illustrating an example process performed, for example, by a user equipment, in accordance with various aspects of the present disclosure.

FIG. 5 is a diagram illustrating an example process 500 performed, for example, by a user equipment (UE), in accordance with various aspects of the present disclosure. Example process 500 is an example where the UE (e.g., UE 120 and/or the like) performs operations associated with a multi transmit/receive point make before break handover.

As shown in FIG. 5, in some aspects, process 500 may include determining whether a capability of the UE is sufficient for a make-before-break (MBB) handover from a source set of cells to a target set of cells, wherein the source set of cells is provided by a first set of transmit/receive points (TRPs) and the target set of cells is provided by a second set of TRPs (block 510). For example, the UE (e.g., using antenna 252, DEMOD 254, MIMO detector 256, receive processor 258, controller/processor 280, and/or the like) may determine whether a capability of the UE is sufficient for an MBB handover from a source set of cells (e.g., source cell 315) to a target set of cells (e.g., target cell 320), as described above. In some aspects, the source set of cells is provided by a first set of TRPs (e.g., source TRP 305) and the target set of cells is provided by a second set of TRPs (e.g., target TRP 310).

As shown in FIG. 5, in some aspects, process 500 may include selectively performing the MBB handover using a first capability configuration for the MBB handover or a second capability configuration for the MBB handover based at least in part on whether the capability of the UE is sufficient for the MBB handover (block 520). For example, the UE (e.g., using controller/processor 280, transmit processor 264, TX MIMO processor 266, MOD 254, antenna 252, and/or the like) may selectively perform the MBB handover using a first capability configuration for the MBB handover or a second capability configuration for the MBB handover based at least in part on whether the capability of the UE is sufficient for the MBB handover.

Process 500 may include additional aspects, such as any single aspect or any combination of aspects described below and/or in connection with one or more other processes described elsewhere herein.

In a first aspect, the first set of TRPs includes a plurality of TRPs.

In a second aspect, alone or in combination with the first aspect, the second set of TRPs includes a plurality of TRPs.

In a third aspect, alone or in combination with one or more of the first and second aspects, performing the MBB handover using the second capability configuration further comprises dropping one or more links, of a plurality of links associated with the source set of cells and the target set of cells, based at least in part on the second capability configuration and the capability of the UE.

In a fourth aspect, alone or in combination with one or more of the first through third aspects, performing the MBB handover using the second capability configuration further comprises configuring one or more links, of a plurality of links associated with the source set of cells and the target set of cells, based at least in part on the second capability configuration and the capability of the UE.

In a fifth aspect, alone or in combination with one or more of the first through fourth aspects, the capability of the UE relates to a maximum number of control resource sets (CORESETs) configurable for the UE. In a sixth aspect, alone or in combination with any one or more of the first through fifth aspects, a CORESET allocation of the first set of TRPs and a CORESET allocation of the second set of TRPs are based at least in part on the capability of the UE.

In a seventh aspect, alone or in combination with one or more of the first through sixth aspects, the capability of the UE relates to a maximum number of beams or transmission configuration indicator states that can be contemporaneously supported by the UE. In an eighth aspect, alone or in combination with one or more of the first through seventh aspects, a TCI state configuration of the first set of TRPs and a TCI state configuration of the second set of TRPs are based at least in part on the capability of the UE.

In a ninth aspect, alone or in combination with one or more of the first through eighth aspects, the capability of the UE relates to a maximum number of codewords that can be contemporaneously supported by the UE. In a tenth aspect, alone or in combination with one or more of the first through ninth aspects, a codeword configuration of the first set of TRPs and a codeword configuration of the second set of TRPs are based at least in part on the capability of the UE.

In an eleventh aspect, alone or in combination with one or more of the first through tenth aspects, the capability of the UE relates to a maximum number of layers per component carrier that can be contemporaneously supported by the UE. In a twelfth aspect, alone or in combination with one or more of the first through eleventh aspects, a layer configuration of the first set of TRPs and a layer configuration of the second set of TRPs are based at least in part on the capability of the UE.

In a thirteenth aspect, alone or in combination with one or more of the first through twelfth aspects, the capability of the UE relates to a maximum number of control channel candidates that can be monitored by the UE in a slot. In a fourteenth aspect, alone or in combination with one or more of the first through thirteenth aspects, a control channel candidate configuration of the first set of TRPs and a control channel candidate configuration of the second set of TRPs are based at least in part on the capability of the UE.

In a fifteenth aspect, alone or in combination with one or more of the first through fourteenth aspects, selectively performing the MBB handover further comprises performing the MBB handover using one or more multiplexing techniques for at least one of communications via the source set of cells and the target set of cells, or communications with the first set of TRPs and the second set of TRPs.

In a sixteenth aspect, alone or in combination with one or more of the first through fifteenth aspects, the one or more multiplexing techniques comprise a spatial division multiplexing technique using two or more antenna panels for respective TRPs of the first set of TRPs and the second set of TRPs.

In a seventeenth aspect, alone or in combination with one or more of the first through sixteenth aspects, the one or more multiplexing techniques comprise a frequency division multiplexing technique.

In an eighteenth aspect, alone or in combination with one or more of the first through seventeenth aspects, the one or more multiplexing techniques comprise a time division multiplexing technique using a single antenna panel.

In a nineteenth aspect, alone or in combination with one or more of the first through eighteenth aspects, the one or more multiplexing techniques comprise a frequency division multiplexing technique for the communications with the first set of TRPs and the second set of TRPs, and a time division multiplexing or spatial division multiplexing technique for the communications via the source set of cells and the target set of cells.

In a twentieth aspect, alone or in combination with one or more of the first through nineteenth aspects, the one or more multiplexing techniques comprise a time division multiplexing technique for the communications with the first set of TRPs and the second set of TRPs, and a spatial division multiplexing technique for the communications via the source set of cells and the target set of cells.

In a twenty-first aspect, alone or in combination with one or more of the first through twentieth aspects, process 500 includes identifying a partial or full overlap between two or more communications for two or more different TRPs of the first set of TRPs and the second set of TRPs; and dropping one or more communications, of the two or more communications, based at least in part on a rule.

In a twenty-second aspect, alone or in combination with one or more of the first through twenty-first aspects, the rule is based at least in part on at least one of whether a cell via which the one or more communications are received is a source cell or a target cell, a random or pseudorandom rule based at least in part on selecting a highest or lowest TRP index, a quality-of-service threshold, whether the two or more communications are uplink or downlink communications, or a TRP control configuration.

In a twenty-third aspect, alone or in combination with one or more of the first through twenty-second aspects, process 500 includes receiving information identifying respective communication schedules of the first set of TRPs and the second set of TRPs, wherein the MBB handover is being based at least in part on the respective communication schedules.

In a twenty-fourth aspect, alone or in combination with one or more of the first through twenty-third aspects, process 500 includes providing at least part of the information identifying the respective communication schedules to at least one of the first set of TRPs or the second set of TRPs. In a twenty-fifth aspect, alone or in combination with one or more of the first through twenty-fourth aspects, the information identifying the respective communication schedules relates to at least one of an uplink control channel, a downlink control channel, an uplink shared channel, or timing information. In a twenty-sixth aspect, alone or in combination with one or more of the first through twenty-fifth aspects, the information identifying the respective communication schedules relates to a downlink transmission. In a twenty-seventh aspect, alone or in combination with one or more of the first through twenty-sixth aspects, the information identifying the respective communication schedules relates to an uplink transmission.

In a twenty-eighth aspect, alone or in combination with one or more of the first through twenty-seventh aspects, alone or in combination with one or more of the first through eighteenth aspects, information associated with respective communication schedules of the first set of TRPs and the second set of TRPs is communicated over a backhaul link between the first set of TRPs and the second set of TRPs.

In a twenty-ninth aspect, alone or in combination with one or more of the first through twenty-eighth aspects, process 500 includes providing hybrid automatic repeat request (HARQ) feedback for the first set of TRPs and the second set of TRPs.

In a thirtieth aspect, alone or in combination with one or more of the first through twenty-ninth aspects, the HARQ feedback is provided separately for each TRP of the first set of TRPs and the second set of TRPs.

In a thirty-first aspect, alone or in combination with one or more of the first through thirtieth aspects, the HARQ feedback is provided jointly for the first set of TRPs and jointly for the second set of TRPs.

In a thirty-second aspect, alone or in combination with one or more of the first through thirty-first aspects, the HARQ feedback is provided jointly for all TRPs of the first set of TRPs and the second set of TRPs.

In a thirty-third aspect, alone or in combination with one or more of the first through thirty-second aspects, the UE may configure one or more links, of a plurality of links associated with the source set of cells and the target set of cells, based at least in part on the second capability configuration and the capability of the UE.

In a thirty-fourth aspect, alone or in combination with one or more of the first through thirty-third aspects, the first capability configuration is associated with double a capability of the second capability configuration.

In a thirty-fifth aspect, alone or in combination with one or more of the first through thirty-fourth aspects, the first set of TRPs is reconfigured to include a single TRP during the MBB handover, and the second set of TRPs includes a single TRP during the MBB handover.

In a thirty-sixth aspect, alone or in combination with one or more of the first through thirty-fifth aspects, the second set of TRPs is reconfigured to include multiple TRPs during or after the MBB handover.

In a thirty-seventh aspect, alone or in combination with one or more of the first through thirty-sixth aspects, before the MBB handover is initiated, the first set of TRPs includes multiple TRPs.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
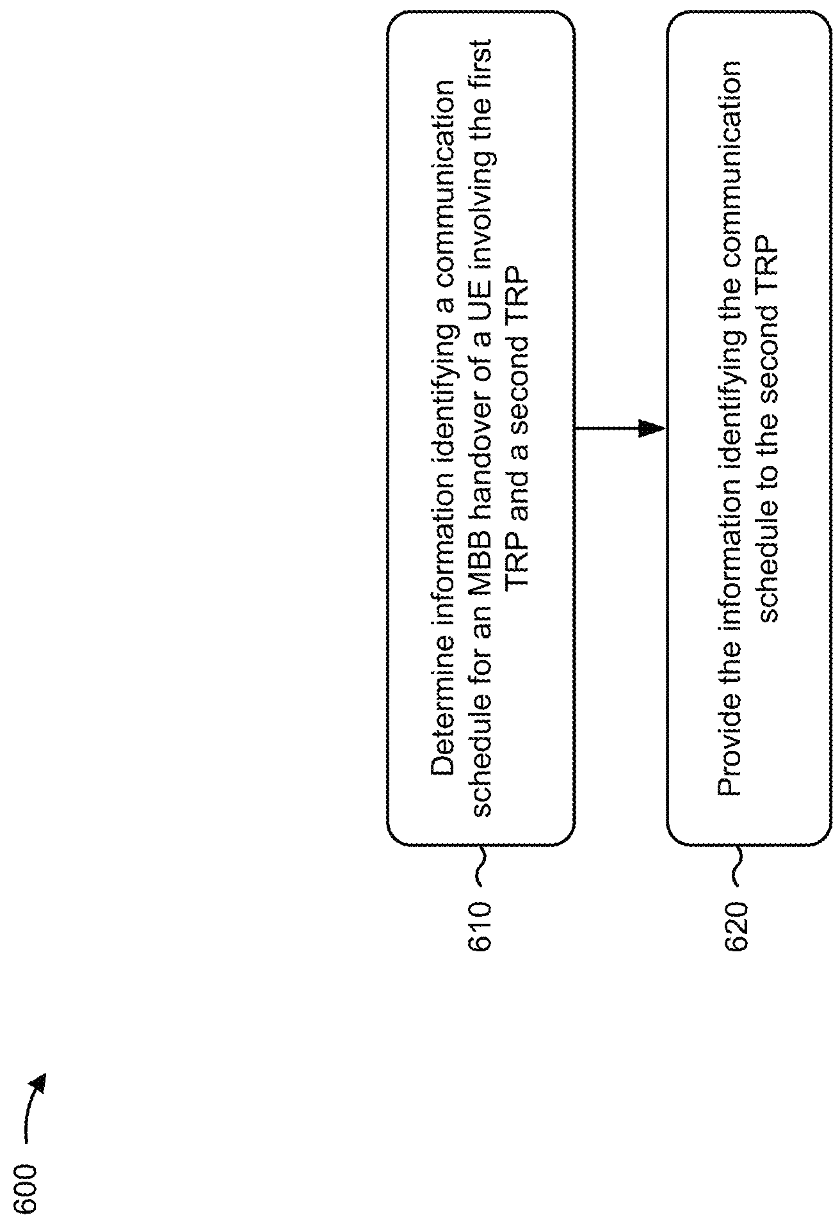
FIG. 6 is a diagram illustrating an example process performed, for example, by a first transmit-receive point (TRP), in accordance with various aspects of the present disclosure.

FIG. 6 is a diagram illustrating an example process 600 performed, for example, by a first transmit/receive point (TRP), in accordance with various aspects of the present disclosure. Example process 600 is an example where the first TRP (e.g., base station 110, TRP 305, TRP 310, and/or the like) performs operations associated with multi-TRP MBB handover.

As shown in FIG. 6, in some aspects, process 600 may include determining information identifying a communication schedule for an MBB handover of a UE involving the first TRP and a second TRP (block 610). For example, the first TRP (e.g., using antenna 234, DEMOD 232, MIMO detector 236, receive processor 238, controller/processor 240, and/or the like) may determine information identifying a communication schedule for an MBB handover of a UE involving the first TRP and a second TRP, as described above.

As further shown in FIG. 6, in some aspects, process 600 may include providing the information identifying the communication schedule to the second TRP (block 620). For example, the first transmit/receive point (TRP) (e.g., using transmit processor 220, receive processor 238, controller/processor 240, memory 242, and/or the like) may provide the information identifying the communication schedule to the second TRP, as described above.

Process 600 may include additional aspects, such as any single aspect or any combination of aspects described below and/or in connection with one or more other processes described elsewhere herein.

In a first aspect, the first TRP is associated with a source group of TRPs and the second TRP is associated with a target group of TRPs.

In a second aspect, alone or in combination with the first aspect, the first TRP is associated with a target group of TRPs and the second TRP is associated with a source group of TRPs.

In a third aspect, alone or in combination with one or more of the first and second aspects, the information identifying the communication schedule is provided via a backhaul link.

In a fourth aspect, alone or in combination with one or more of the first through third aspects, the information identifying the communication schedule is provided via the UE.

In a fifth aspect, alone or in combination with one or more of the first through fourth aspects, process 600 includes configuring, based at least in part on a capability of the UE for the MBB handover, at least one of: a control resource set allocation of the first base station or the second base station, a transmission configuration indicator (TCI) state configuration of the first base station or the second base station, a codeword configuration of the first is basing station or the second base station, a layer configuration of the first base station or the second base station, or a control channel candidate configuration of the first base station or the second base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining whether a capability of the UE is sufficient for a make-before-break (MBB) handover from a source set of cells to a target set of cells, wherein the source set of cells is provided by a first set of transmit/receive points (TRPs) and the target set of cells is provided by a second set of TRPs, and wherein the MBB handover is based at least in part on respective communication schedules associated with the first set of TRPs and the second set of TRPs; and selectively performing the MBB handover using a first capability configuration for the MBB handover or a second capability configuration for the MBB handover based at least in part on whether the capability of the UE is sufficient for the MBB handover.

2. The method of claim 1, wherein performing the MBB handover using the second capability configuration further comprises:

dropping one or more links, of a plurality of links associated with the source set of cells and the target set of cells, based at least in part on the second capability configuration and the capability of the UE.

3. The method of claim 1, wherein performing the MBB handover using the second capability configuration further comprises:

configuring one or more links, of a plurality of links associated with the source set of cells and the target set of cells, based at least in part on the second capability configuration and the capability of the UE.

4. The method of claim 1, wherein the capability of the UE relates to a maximum number of control resource sets (CORESETs) configurable for the UE, and wherein a CORESET allocation of the first set of TRPs and a CORESET allocation of the second set of TRPs are based at least in part on the capability of the UE.

5. The method of claim 1, wherein the capability of the UE relates to a maximum number of beams or transmission configuration indicator (TCI) states that can be contemporaneously supported by the UE, and wherein a TCI state configuration of the first set of TRPs and a TCI state configuration of the second set of TRPs are based at least in part on the capability of the UE.

6. The method of claim 1, wherein the capability of the UE relates to a maximum number of codewords that can be contemporaneously supported by the UE, and wherein a codeword configuration of the first set of TRPs and a codeword configuration of the second set of TRPs are based at least in part on the capability of the UE.

7. The method of claim 1, wherein the capability of the UE relates to a maximum number of layers per component carrier that can be contemporaneously supported by the UE, and wherein a layer configuration of the first set of TRPs and a layer configuration of the second set of TRPs are based at least in part on the capability of the UE.

8. The method of claim 1, wherein the capability of the UE relates to a maximum number of control channel candidates that can be monitored by the UE in a slot, and wherein a control channel candidate configuration of the first set of TRPs and a control channel candidate configuration of the second set of TRPs are based at least in part on the capability of the UE.

9. The method of claim 1, wherein selectively performing the MBB handover further comprises:

performing the MBB handover using one or more multiplexing techniques for at least one of:

communications via the source set of cells and the target set of cells, or communications with the first set of TRPs and the second set of TRPs.

10. The method of claim 1, further comprising:

identifying a partial or full overlap between two or more communications for two or more different TRPs of the first set of TRPs and the second set of TRPs; and dropping one or more communications, of the two or more communications, based at least in part on a rule, wherein the rule is based at least in part on at least one of:

whether a cell, via which the one or more communications are received, is a source cell or a target cell, a random or pseudorandom rule based at least in part on selecting a highest or lowest TRP index, a quality-of-service threshold, whether the two or more communications are uplink or downlink communications, or a TRP control configuration.

11. The method of claim 1, further comprising:

receiving information identifying the respective communication schedules associated with the first set of TRPs and the second set of TRPs, wherein the MBB handover is determined based at least in part on the information; and providing at least part of the information identifying the respective communication schedules to at least one of the first set of TRPs or the second set of TRPs.

12. The method of claim 1, further comprising:

providing hybrid automatic repeat request (HARM) feedback for the first set of TRPs and the second set of TRPs.

13. The method of claim 1, wherein the first set of TRPs is reconfigured to include a single TRP during the MBB handover, and wherein the second set of TRPs includes a single TRP during the MBB handover, and one or more of:

wherein the second set of TRPs is reconfigured to include multiple TRPs during or after the MBB handover, or wherein, before the MBB handover is initiated, the first set of TRPs includes multiple TRPs.

14. A method of wireless communication performed by a first transmit/receive point (TRP), comprising:

determining information identifying a communication schedule for a make-before-break (MBB) handover of a user equipment (UE) involving the first TRP and a second TRP; and providing the information identifying the communication schedule to the second TRP.

15. The method of claim 14, wherein the first TRP is associated with a source group of TRPs and wherein the second TRP is associated with a target group of TRPs.

16. The method of claim 14, wherein the first TRP is associated with a target group of TRPs and the second TRP is associated with a source group of TRPs.

17. The method of claim 14, wherein the information identifying the communication schedule is provided via a backhaul link or via the UE.

18. The method of claim 14, further comprising:

configuring, based at least in part on a capability of the UE for the MBB handover, at least one of:

a control resource set allocation of the first TRP or the second TRP, a transmission configuration indicator (TCI) state configuration of the first TRP or the second TRP, a codeword configuration of the first TRP or the second TRP, a layer configuration of the first TRP or the second TRP, or a control channel candidate configuration of the first TRP or the second TRP.

19. A user equipment (UE) for wireless communication, comprising:
a memory; and
one or more processors configured to:
determine whether a capability of the UE is sufficient for a make-before-break (MBB) handover from a source set of cells to a target set of cells,
wherein the source set of cells is provided by a first set of transmit/receive points (TRPs) and the target set of cells is provided by a second set of TRPs, and
wherein the MBB handover is based at least in part on respective communication schedules associated with the first set of TRPs and the second set of TRPs; and
selectively perform the MBB handover using a first capability configuration for the MBB handover or a second capability configuration for the MBB handover based at least in part on whether the capability of the UE is sufficient for the MBB handover.

20. The UE of claim 19, wherein, when performing the MBB handover using the second capability configuration, the one or more processors are configured to:
drop one or more links, of a plurality of links associated with the source set of cells and the target set of cells, based at least in part on the second capability configuration and the capability of the UE.

21. The UE of claim 19, wherein, when performing the MBB handover using the second capability configuration, the one or more processors are configured to:
configure one or more links, of a plurality of links associated with the source set of cells and the target set of cells, based at least in part on the second capability configuration and the capability of the UE.

22. The UE of claim 19, wherein the capability of the UE relates to a maximum number of control resource sets (CORESETs) configurable for the UE, and
wherein a CORESET allocation of the first set of TRPs and a CORESET allocation of the second set of TRPs are based at least in part on the capability of the UE.

23. The UE of claim 19, wherein the capability of the UE relates to a maximum number of beams or transmission configuration indicator (TCI) states that can be contemporaneously supported by the UE, and
wherein a TCI state configuration of the first set of TRPs and a TCI state configuration of the second set of TRPs are based at least in part on the capability of the UE.

24. The UE of claim 19, wherein the capability of the UE relates to a maximum number of codewords that can be contemporaneously supported by the UE, and
wherein a codeword configuration of the first set of TRPs and a codeword configuration of the second set of TRPs are based at least in part on the capability of the UE.

25. The UE of claim 19, wherein the capability of the UE relates to a maximum number of layers per component carrier that can be contemporaneously supported by the UE, and
wherein a layer configuration of the first set of TRPs and a layer configuration of the second set of TRPs are based at least in part on the capability of the UE.

26. The UE of claim 19, wherein the capability of the UE relates to a maximum number of control channel candidates that can be monitored by the UE in a slot, and
wherein a control channel candidate configuration of the first set of TRPs and a control channel candidate configuration of the second set of TRPs are based at least in part on the capability of the UE.

27. The UE of claim 19, wherein, when selectively performing the MBB handover, the one or more processors are configured to:
perform the MBB handover using one or more multiplexing techniques for at least one of:
communications via the source set of cells and the target set of cells, or
communications with the first set of TRPs and the second set of TRPs.

28. The UE of claim 19, wherein the one or more processors are further configured to:
identify a partial or full overlap between two or more communications for two or more different TRPs of the first set of TRPs and the second set of TRPs; and
drop one or more communications, of the two or more communications, based at least in part on a rule,
wherein the rule is based at least in part on at least one of:
whether a cell, via which the one or more communications are received, is a source cell or a target cell,
a random or pseudorandom rule based at least in part on selecting a highest or lowest TRP index,
a quality-of-service threshold,
whether the two or more communications are uplink or downlink communications, or
a TRP control configuration.

29. The UE of claim 19, wherein the one or more processors are further configured to:
receive information identifying the respective communication schedules associated with the first set of TRPs and the second set of TRPs, wherein the MBB handover is determined based at least in part on the information; and
provide at least part of the information identifying the respective communication schedules to at least one of the first set of TRPs or the second set of TRPs.

30. The UE of claim 19, wherein the one or more processors are further configured to:
provide hybrid automatic repeat request (HARM) feedback for the first set of TRPs and the second set of TRPs.

31. The UE of claim 19, wherein the first set of TRPs is reconfigured to include a single TRP during the MBB handover, and wherein the second set of TRPs includes a single TRP during the MBB handover, and
one or more of:
wherein the second set of TRPs is reconfigured to include multiple TRPs during or after the MBB handover, or
wherein, before the MBB handover is initiated, the first set of TRPs includes multiple TRPs.

32. A first transmit/receive point (TRP) for wireless communication, comprising:
a memory; and
one or more processors configured to:
determine information identifying a communication schedule for a make-before- break (MBB) handover of a user equipment (UE) involving the first TRP and a second TRP; and
provide the information identifying the communication schedule to the second TRP.

33. The first TRP of claim 32, wherein the first TRP is associated with a source group of TRPs and wherein the second TRP is associated with a target group of TRPs.

34. The first TRP of claim 32, wherein the first TRP is associated with a target group of TRPs and the second TRP is associated with a source group of TRPs.

35. The first TRP of claim 32, wherein the information identifying the communication schedule is provided via a backhaul link or via the UE.

36. The first TRP of claim 32, wherein the one or more processors are further configured to:

configure, based at least in part on a capability of the UE for the MBB handover, at least one of:

a control resource set allocation of the first TRP or the second TRP, a transmission configuration indicator (TCI) state configuration of the first TRP or the second TRP, a codeword configuration of the first TRP or the second TRP, a layer configuration of the first TRP or the second TRP, or a control channel candidate configuration of the first TRP or the second TRP.

* * * * *